May 8, 1956
H. BREITMAN
2,744,444
CAMERA CONVERTIBLE INTO A SLIDE PROJECTOR AND AN
ATTACHMENT FOR EFFECTING SUCH CONVERSION
Filed May 10, 1951
3 Sheets-Sheet 1
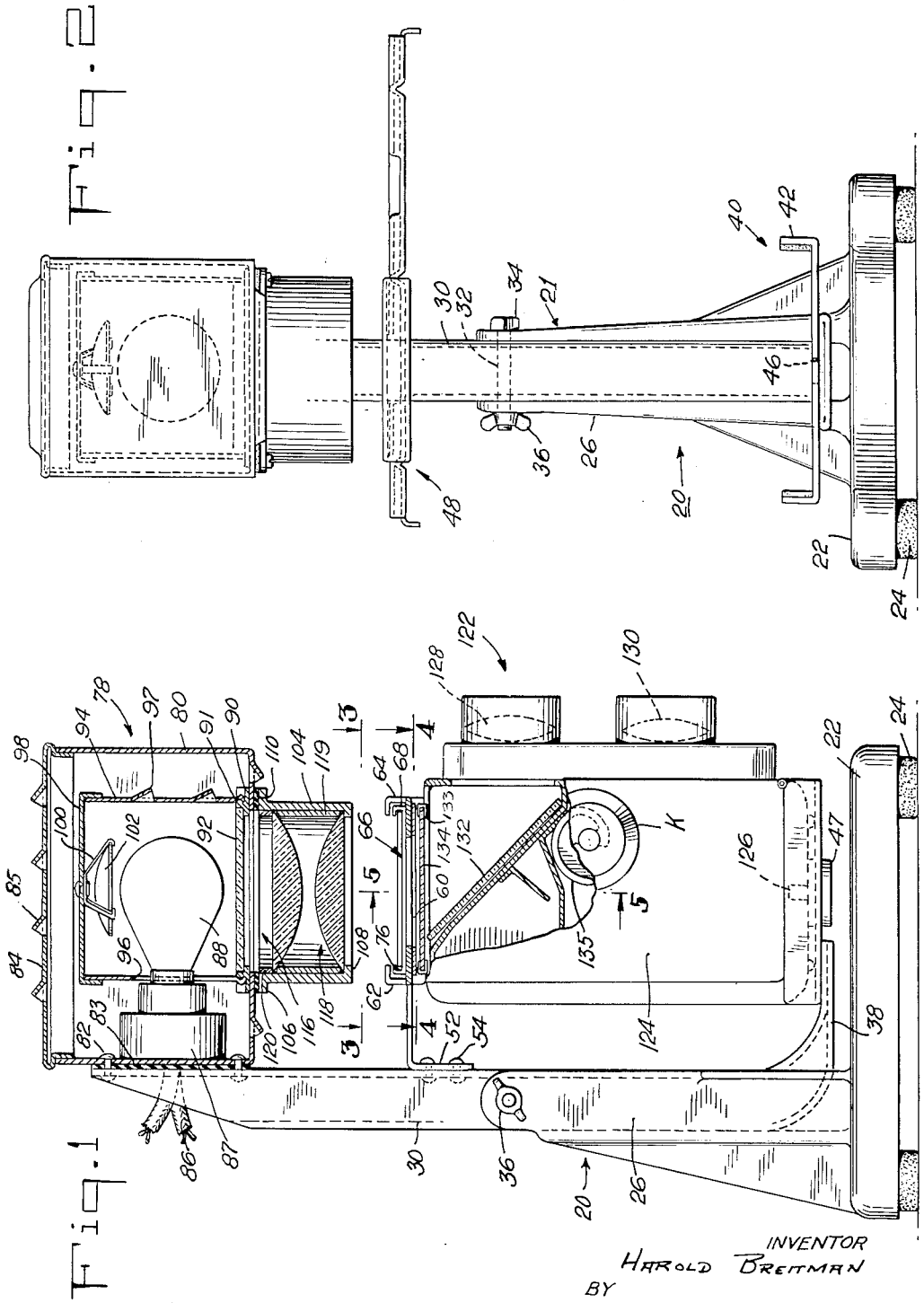
INVENTOR
HAROLD BREITMAN
BY
ATTORNEY May 8, 1956  H. BREITMAN  2,744,444
CAMERA CONVERTIBLE INTO A SLIDE PROJECTOR AND AN
ATTACHMENT FOR EFFECTING SUCH CONVERSION
Filed May 10, 1951  3 Sheets-Sheet 2

INVENTOR
HAROLD BREITMAN
BY
ATTORNEY

May 8, 1956  H. BREITMAN  2,744,444
CAMERA CONVERTIBLE INTO A SLIDE PROJECTOR AND AN
ATTACHMENT FOR EFFECTING SUCH CONVERSION
Filed May 10, 1951  3 Sheets-Sheet 3

INVENTOR
HAROLD BREITMAN
BY
ATTORNEY

United States Patent Office 2,744,444
Patented May 8, 1956

2,744,444

CAMERA CONVERTIBLE INTO A SLIDE PROJECTOR AND AN ATTACHMENT FOR EFFECTING SUCH CONVERSION

Harold Breitman, Flushing, N. Y.

Application May 10, 1951, Serial No. 225,538

6 Claims. (Cl. 88—26)

This invention relates to a camera convertible into a slide projector and to an attachment for effecting such conversion.

It is the principal object of my invention to provide a camera of special design and a slide projection camera-conversion attachment for optional use therewith.

More particularly, it is the main object of my invention to provide a camera and attachment of the character described which can be coupled or uncoupled optically and mechanically in a simple, convenient and speedy fashion, so that the same are jointly usable as a slide projector, or the camera alone is usable as a conventional camera.

It is a more specific object of my invention to provide a camera and attachment of the character described which permit the camera to be converted from either one to the other of its dual uses without disturbing the picture-taking system, i. e. wtihout removing or shifting the light-sensitive film with which the camera may be loaded, so that the changeover from one to another of the uses of the camera can be effected rapidly, without impairing the picture-taking ability of the camera, without observing precautions against spoiling the film and without disturbing or tampering with the delicate and expensive shutter, diaphragm and picture-taking lens system.

It is a further object of my invention to provide a camera and attachment of the character described which are sturdy, light, compact, easy to handle and inexpensive to manufacture.

It is a special object of my invention to provide a camera and attachment of the character described wherein the view-finding system of the camera is employed as the optical system of the slide projector.

It is an additional object of my invention to provide a camera and attachment of the character described wherein the view-finding system of a reflex camera is utilized for slide projection.

It is a specific object of my invention to provide a novel camera of the character described which can be employed in conjunction with a slide projection camera-conversion attachment.

It is another specific object of my invention to provide a novel slide projection camera-conversion attachment of the character described for use with a camera of special design.

It is another object of my invention to provide a reflex camera and attachment of the character described through whose joint use a brilliant, sharp and clear enlargement of a slide may be projected without an expensive slide projector having an optical system which is the equivalent of the optical system of the view-finder of a reflex camera.

Other objects of my invention will in part be obvious and in part will be pointed out hereinafter.

My invention accordingly consists in the features of construction, combinations of elements and arrangements of parts which will be exemplified in the devices hereinafter described and of which the scope of application will be indicated in the appended claims.

In the acocmpanying drawings in which are shown various possible embodiments of my invention, Fig. 1 is a partially broken away side view of a coupled reflex camera and slide projection camera-conversion attachment embodying my invention;

Fig. 2 is a front view of the attachment alone;

Figure 3:
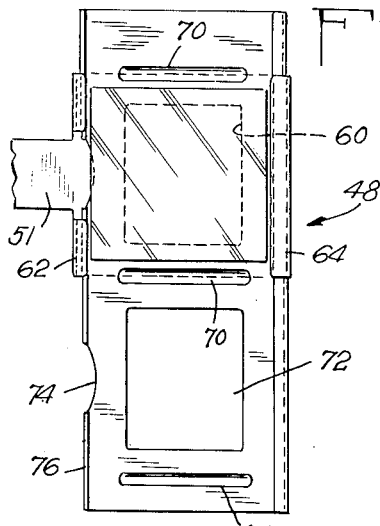
Fig. 3 is a fragmentary view of the attachment as seen from the line 3—3 of Fig. 1.
Figure 5:
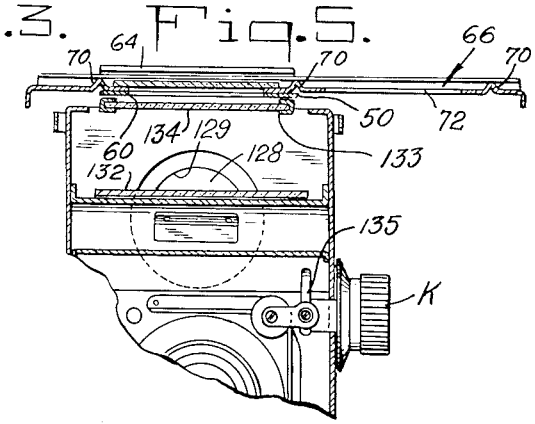
Fig. 5 is a fragmentary sectional view of the coupled camera and attachment taken substantially along the line 5—5 of Fig. 1.
Figure 4:
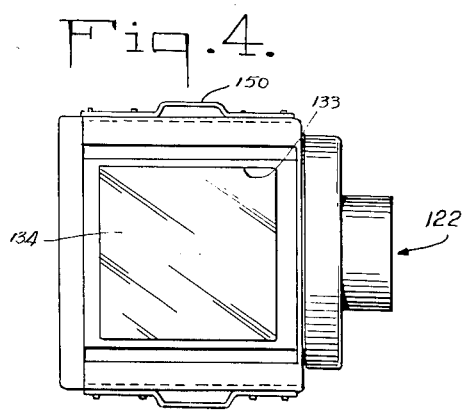
Fig. 4 is a view of the camera as seen from the line 4—4 of Fig. 1.

Referring now in detail to the drawings, and more particularly to Figs. 1–7, the reference numeral 20 denotes a slide projection camera-conversion attachment embodying the present invention. The frame 21 of said attachment includes a pedestal 22 having cushioning feet 24 and an erect chanel-shaped post 26. A standard 30 is located between the flanges of the post and is horizontally pivoted to the post near its upper end, as by a bolt 32 having a head 34 on the outer side of one of the flanges and a meshing wing nut 36 on the outer side of the other flange. Said bolt passes through registered openings in the flanges and standard. The standard makes a sliding fit with the flanges and extends almost to the pedestal so that the standard 30 can be turned about its pivot when the nut is loose, while tightening of the nut serves to hold the standard in position by flexing the flanges against it, said flanges being somewhat resilient.

The bottom of the standard extends away from the back of the pedestal so as to form a short forwardly directed horizontal flange 38 corresponding to the horizontal leg of an L. The flange is made quite squat so that a camera thereon may be located close to the base for better equilibrium and compactness.

A camera holder 40 having upstanding sides 42 and a central hole 46 is attached to the top of the flange 38. Said holder is of proper dimensions to accommodate comfortably the base of a conventional twin lens reflex camera. The dimensions and function of the hole will be explained hereinafter.

A slide holder 48 is secured on the standard, said holder being spaced a distance from the camera holder such that a conventional twin lens reflex camera without its hood can be located therebetween. The slide holder includes a horizontal platform 50 having a shank 51 with a short depending flange 52 which is attached as by rivets 54 to the standard 30. The platform 50 is approximately centered over the camera holder.

Optionally, flange 52 may be slidably mounted on the standard in such fashion as to permit vertical adjustment of the platform in order to accommodate cameras of different heights.

The platform is shaped to function as a slide carrier guide and to this end is formed with a large central opening 60 and a pair of parallel erect front and back flanges 62, 64. The tops of said flanges extend horizontally towards each other.

A slide carrier 66 is provided, the same constituting an elongated sheet slidably fitting between the flanges of the carrier guide. Said carrier has an upstanding flange 68 along its long edge remote from the standard when the carrier is in the guide, said flange having its top bent back to lie over the body of the carrier (see Fig. 1) in spaced relationship thereto. Three ridges 70 protrude upwardly from the carrier, one ridge being centered thereon. On each side of the central ridge is a large opening 72 of the proper size for the type of slide to be projected. One of the remaining ridges is located on the side of one opening remote from the center ridge and the last ridge is located on the side of the other opening remote from the center ridge. Each side ridge is spaced from the center ridge a little more than the length of a conventional slide, the dimensions of the openings 72 in the carrier being somewhat less than those of the slide. On the back edge of the carrier two finger indentations 74 are provided, one opposite each opening. These permit the slides to be handled by their edges. Between the indentations themselves and between each indentation and the adjacent end of the carrier upstanding flanges 76 are formed.

The carrier slides in the guide, and when either opening in the carrier is in registry with the single fixed opening in the guide, the other opening in the carrier is free so that a slide thereon may be changed easily. When the latter opening is slid into registry with the guide opening, the other side of the carrier can be reloaded. The ridges and flanges keep the slides in place.

Near the top of the standard and on the front thereof is located a light supply unit 78. Said unit includes an outer casing 80 constituting an open-top box having a large opening in its bottom. The box is attached, as by rivets 82, to the standard, a heat-insulating washer 83 being interposed therebetween. A cover 84 fits the top of the box, said cover having louvers 85 to allow hot air to escape. Louvers also are provided in the bottom wall of the box.

A socket 87 for an electric projection lamp is suitably secured on the inside of the box adjacent the standard, and said standard, box, and washer have registered openings to admit electric power leads 86. A conventional projection lamp 88 is fitted into said socket.

An apertured heat resistant support 90 disposed above and in registry with the opening in the bottom of the casing 80 has an integral upstanding flange 91 within which a heat-resistant pane of glass 92 is disposed.

The envelope of the projection lamp is contained within an open-ended lamp enclosure 94 whose lower end rests on the support 90 and has a pair of spring fingers resiliently engaging heads on the support to facilitate relamping. An opening 96 in the lamp enclosure admits the neck of the bulb. Louvers 97 are supplied in the enclosure for the usual purpose. A cover 98 closes the top of the enclosure, said cover having secured thereto, as by a holder 100, a spherical reflector 102.

A vertical lens holder 104 having an outwardly extending top flange 106 and an inwardly extending lower flange 108 is attached by its top flange to the casing 80 around the opening in the bottom thereof. A heat-insulating washer 110 is located between said top flange and the casing, the opening of the washer being registered with the lens holder. The lens holder 104, support 90 and washer 110 are suitably secured to the bottom wall of the casing 80 and of the frame, as by nuts and screws.

The large opening in the bottom of the casing, the openings in the support and washer, and the opening of the lens holder are in registry producing thereby a through bore 116, said bore being larger than the openings in the slide carrier and in alignment with the opening in the slide carrier guide.

A plano-convex collimating lens system 118 is carried by the lens holder. Said system includes one lens resting on the lower flange of the lens holder and a second lens held above the first by a spacer 119, the lenses being secured in the holder by a clamp 120.

The type of camera with which the above-described slide projection camera-conversion attachment 20 is particularly designed to be used is that commonly called a twin lens reflex camera. Such cameras and, indeed, all the so-called "reflex" cameras are characterized by large aperture good quality view-finding lenses which present to the user a brilliant, undistorted duplicate of the picture to be cast on the film. In addition, most reflex cameras have focusable view-finding systems. My invention utilizes these characteristic features of reflex cameras.

The reference numeral 122 denotes a twin lens reflex camera embodying my invention. A box-like casing 124 supports and houses the sundry parts of the camera which include, inter alia, a large aperture view-finding system. Said casing has a tapped opening 126 in the middle of its base, this opening being of the same diameter as the hole 46 in the camera holder. When these openings are aligned, a headed bolt 47 can be screwed through hole 46 and into the camera thereby to rapidly detachably secure the camera to the attachment. The camera is oriented on the holder to face forwardly, away from standard 30. A large aperture view-finding lens 128 is provided at the scene opening 129 of the view-finding system above a picture taking lens 130 at the front of the camera. A reflex mirror 132 is disposed within the casing at an angle of 45° to the optical axis of the lens 128, the center of the mirror being located substantially on said axis. The mirror is oriented to reflect the view-finding beam to the large aperture eye opening 133 of the view-finding system at the top of the camera.

Attached to the camera is a hood unit which will be described in greater detail hereafter. Said hood must be removed before the camera can be used for slide projection as will be explained later. It is for this reason that, as already noted, the slide holder 48 need be spaced from the camera holder 40 a distance only slightly greater than the height of the camera without the hood.

The large aperture eye opening 133 at the top of the camera above the reflex mirror is covered with a transparent, colorless pane 134 of glass or like material to protect the view-finding system when the hood is removed. In cameras not specially constructed for slide projection in accordance with my invention no such pane is present.

The hole 46 in the camera holder is so disposed with respect to the hole in the bottom of the camera and the view-finding system thereof that when the camera is secured on the holder the large aperture eye opening will be in registry with the opening in the slide carrier guide. For example, in the embodiment shown in Figs. 1–7, the hole in the camera holder is aligned with the carrier guide opening, and the hole in the bottom of the camera is aligned with the eye opening 133.

When used for picture taking, the camera is focused by a knob K through a track cam and follower 135 which simultaneously effect a corresponding change in the distance from the view-finding lens to the reflex mirror. For projection, the same method is employed to focus the slide image on a viewing surface.

A frosted glass pane 136 is carried by the hood to supply a translucent surface on which the view-finding image is focused. This pane is located at the bottom of the hood immediately above the clear pane 134. The frosted pane is located at the focus of the view finding lens system, and the attachment 20 is so proportioned that a slide in the slide holder will be disposed substantially in the same plane. The frosted pane is not needed for projection and, indeed, interferes with the same by reducing the intensity of and diffusing the projection beam. For this reason pursuant to my invention the hood to which the frosted pane is attached is secured to the camera in such fashion that it can be detached rapidly when the camera is to be used with the attachment for slide projection.

To recapitulate, in accordance with my invention a reflex camera is structurally modified so as to be usable with the attachment 20 by incorporating means for quickly and conveniently removing the attaching hood and frosted viewing screen from the camera and by the provision of a permanent plate of clear glass over the large aperture eye opening of the view-finding system.

Figure 6:
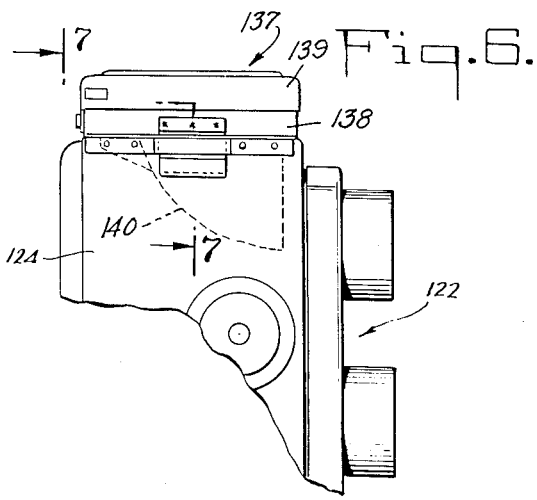
Fig. 6 is a fragmentary side view of the camera as it appears when uncoupled from the attachment and ready for use in taking pictures.
Figure 7:
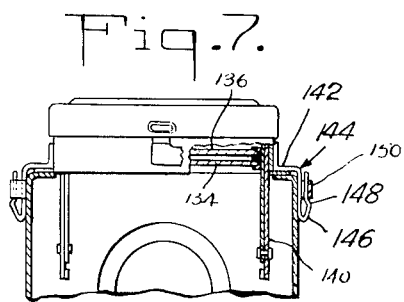
Fig. 7 is a sectional view taken substantially along the line 7—7 of Fig. 6.

The hood 137 shown in Figs. 6 and 7 comprises a square frame 138 of appropriate size having pivoted to its front edge a panel 139 from whose side edges sector-shaped flanges 140 depend. A similarly flanged panel is pivoted to the back of the hood. When the panels are erect they define, in conjunction with the flanges, a tube which shades the frosted viewing screen. The hood is closed by folding the panels inwardly one over the other. At such time the flanges 140 project through slots on opposite sides of the frosted viewing screen (see Fig. 6) secured to the hood. Conventional means is included to lock the hood shut and to bias the hood to open position.

On each side of the hood an outwardly extending flange 142 carries a depending locking tongue 144 in the form of a slender U-shaped resilient member whose outer leg 146 has an inset 148. At each side of the camera and slightly below the top thereof a squat bail 150 is provided to receive said tongues. The height of the bail is slightly less than the thickness of the tongue so that when the tongue is inserted it is compressed until the inset passes the bottom of the bail, after which the resilience of the tongue will restore it to its original thickness, thus locking the tongue in the bail and the hood on the camera casing. To remove the hood the tongues are squeezed manually to disengage the insets from the bails whereupon the hood can be lifted freely.

The foregoing vertical coupling of the hood and camera is employed to permit the sector-shaped flanges to be withdrawn from or inserted through slots on opposite sides of the clear pane 134. It will be understood, however, that the specific structural details of the coupling are merely exemplitive.

Figure 8:
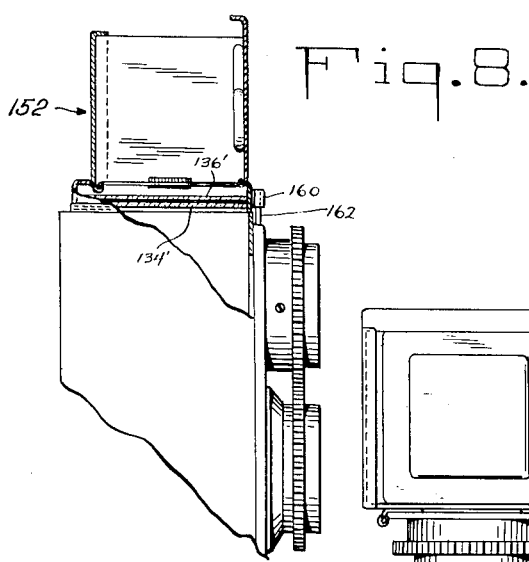
Fig. 8 is a partially broken away fragmentary side view of a reflex camera embodying a modified form of my invention, the camera being illustrated apart from a conversion attachment and with its viewing hood open.
Figure 9:
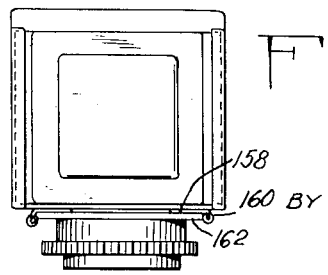
Fig. 9 is a top view of the camera shown in Fig. 8, the hood being closed.
Figure 10:
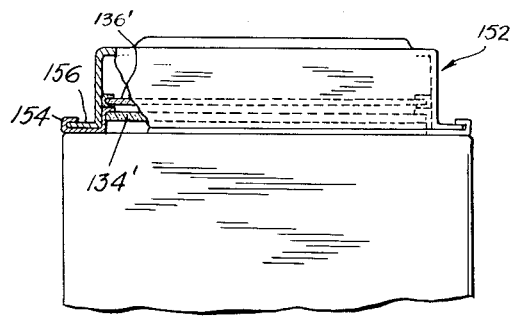
Fig. 10 is an enlarged rear view of the hood of the camera shown in Fig. 8.

A different type of hood 152 is shown in Figs. 8 to 10. This hood differs from the hood 137 in that the sides of the shading tube are pivoted to the frame independently of the front and back panels so that the hood is closed by folding its four walls flat over one another and accordingly nothing projects below the frame when the hood is closed.

Due to this variation, there can be used for the hood 152 a different type of attaching means including for example, a pair of inwardly facing channels 154 secured at each top edge of the camera and slidably receiving outwardly extending flanges 156 on the hood. Note that in this modified hood the sides of the clear glass 134' are not spaced from the hood by slots.

Means also is included to detachably retain the hood in its coupled position. Said means constitutes a resilient strip 158 mounted on the front edge of the hood frame. The ends 160 of the strip are turned forwardly and are inclined slightly toward one another. When the hood is moved into coupled position said ends are adapted to snap over the ends of a rigid plate 162 fixed on the camera casing.

The construction just described is possible because the parts of the hood do not extend below the frame when the hood is closed, so the latter may be coupled by horizontal movement if desired. It is apparent that, should it be desired, a vertical type of coupling attachment alternatively can be employed with this modified type of hood.

Figure 11:
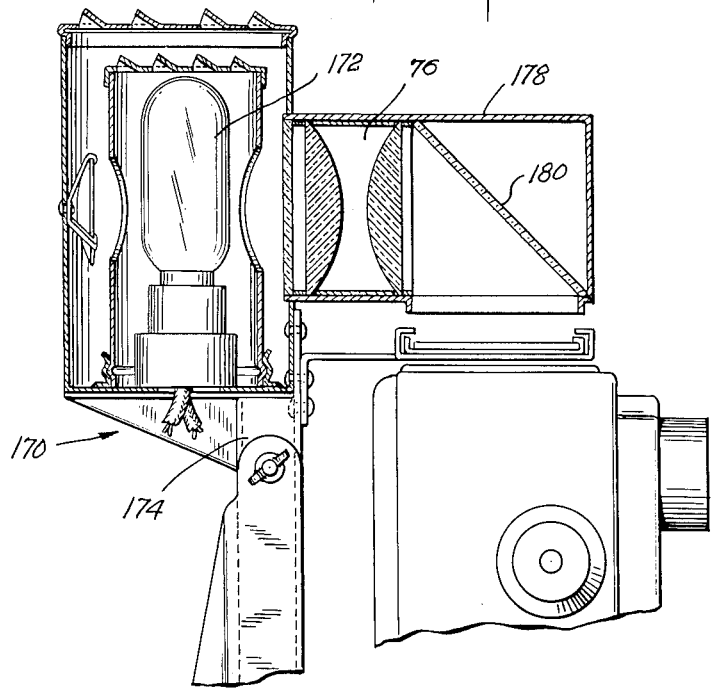
Fig. 11 is a view similar to Fig. 1 of a conversion attachment embodying a modified form of my invention.

In Fig. 11 I have shown a modified form of conversion attachment 170 embodying the present invention and essentially differing from the attachment 20 in that a vertical rather than a horizontal projection lamp is used. A vertical projection lamp 172 is located atop the standard 174 and projects a beam of light forwardly parallel to the base. A collimating lens system 176 is supported by a lens holder 178 in front of the standard but behind the slide carrier guide. Said lens holder also supports a mirror 180 located directly over the camera guide, the bottom of the holder being cut away. The mirror is disposed at an angle of 45° to the horizontal optical axis of the collimating system and directs light vertically downward through the carrier guide. In this way light is beamed into the camera through the slide holder unit as in the first described form of my invention.

To use my invention, a reflex camera of special construction, as described above, with its hood removed, is secured to the camera holder of the attachment, and the projection lamp is turned on. A slide is placed over one opening in the slide carrier, and that opening is pushed into registry with the opening in the carrier guide. A screen is placed in any convenient position in the room, and the standard pivoted so that the light is projected on the same. The camera focussing means is operated to bring the picture into focus on the screen.

If it is desired to employ the camera for taking pictures, the camera merely is disengaged from the conversion attachment and its hood attached. It will be appreciated that the camera may be used for projection while loaded with unexposed film.

Because of the excellent lens system, the large aperture lenses and the focussing mechanism, anyone employing my invention can project a clear, brilliant, sharp slide image.

It thus will be seen that I have provided devices which achieve all the objects of my invention and are well adapted to meet the conditions of practical use.

As various possible embodiments might be made of the above invention, and as various changes might be made in the embodiments above set forth, it is to be understood that all matter herein described, or shown in the accompanying drawings, is to be interpreted as illustrative and not in a limiting sense.

Having thus described my invention, I claim as new and desire to secure by Letters Patent:

1. An apparatus for slide projection, said apparatus comprising a projection attachment, a modified focusable twin-lens reflex camera, and means rapidly detachably securing said camera to said attachment; said projection attachment including a base, a frame, a socket on said frame for a projection lamp, a slide holder carried by said frame and disposed above the base, said slide holder having an opening therein, and means carried by the frame directing light from the projection lamp through the slide holder opening downwardly towards the base; said modified focusable twin-lens reflex camera having a picture-taking system and a large aperture, optically unobstructed view-finding system, said view-finding system including an eye opening at the top of the camera and a scene opening at the front of the camera, the eye opening of said system being disposed in line with the opening in the slide holder and constituting thereby projection means for light which has passed through said opening in the slide holder, a separate hood for shielding the eye opening, a pane of frosted glass permanently carried by said hood, means rapidly detachably securing said hood to said camera over the eye opening against lateral and vertical movement with the pane at the focus of the view-finding system, whereby the hood and thus the pane of frosted glass can be rapidly removed for use of the camera in the slide projection apparatus, and means blocking the view-finding system optically from the picture-taking system of the camera; and the means rapidly detachably securing the camera to the frame locating said camera with its eye opening disposed in line with the opening in said slide holder and on the side of the same opposite from the side on which light is directed through the slide holder.

2. An apparatus for slide projection, said apparatus comprising a projection attachment, a modified focusable twin-lens reflex camera, and means rapidly detachably securing said camera to said attachment; said projection attachment including a base, a frame, a socket on said frame for a projection lamp, a slide holder carried by said frame and disposed above the base, said slide holder having an opening therein, and means carried by the frame directing light from the projection lamp through the slide holder opening downwardly towards the base; said modified focusable twin-lens reflex camera having a picture-taking system and a large aperture, optically unobstructed view-finding system, said view-finding system including an eye opening at the top of the camera and a scene opening at the front of the camera, the eye opening of said system being disposed in line with the opening in the slide holder and constituting thereby projection means for light which has passed through said opening in the slide holder, a separate hood for shielding the eye opening, a pane of frosted glass permanently carried by said hood, means rapidly detachably securing said hood to said camera over the eye opening against lateral and vertical movement with the pane at the focus of the view-finding system, whereby the hood and thus the pane of frosted glass can be rapidly removed on use of the camera in the slide projection apparatus, and means blocking the view-finding system optically from the picture-taking system of the camera; and the means rapidly detachably securing the camera to the frame locating said camera with its eye opening disposed in line with the opening in said slide holder and on the side of the same opposite from the side on which light is directed through the slide holder, said camera securing means constituting a threaded opening in the bottom of the camera, a camera holder carried by the frame, said holder having an opening therein at least of the same diameter as that of the opening in the camera bottom, and a bolt having a head of a diameter larger than that of the opening in the camera holder, the shank of said bolt fitting the opening in the camera, whereby the bolt can be screwed into said opening in the camera when it is in registry with the opening in the camera holder.

3. In a slide projection camera combination including a projection attachment comprising a frame, a projection lamp and a slide holder carried by the frame, and means on the frame to direct light from the projection lamp through the slide holder downwardly: a modified focusable twin-lens reflex camera having a picture-taking system and a large aperture, optically unobstructed view-finding system, said view-finding system including an eye opening at the top of the camera and a scene opening at the front of the camera, a separate hood for shielding the eye opening, a pane of frosted glass permanently carried by said hood, means rapidly detachably securing said hood to said camera over the eye opening against lateral and vertical movement with the pane at the focus of the view-finding system, whereby the hood and thus the pane of frosted glass can be rapidly removed in use of the camera in said slide projection camera combination, means blocking the view-finding system optically from the picture-taking system of the camera, and means on the camera cooperating with means on the frame for rapidly detachably securing the camera to the frame with the eye opening disposed in line with the slide holder and on the side of the same opposite from the side on which light is directed through the slide holder.

4. In a slide projection camera combination including a projection attachment comprising a frame, a projection lamp and a slide holder carried by the frame, and means on the frame to direct light from the projection lamp through the slide holder downwardly: a modified focusable twin-lens reflex camera having a picture-taking system and a large aperture, optically unobstructed view-finding system, said view-finding system including an eye opening at the top of the camera and a scene opening at the front of the camera, a separate hood for shielding the eye opening, a pane of frosted glass permanently carried by said hood, means rapidly detachably securing said hood to said camera over the eye opening against lateral and vertical movement with the pane at the focus of the view-finding system, whereby the hood and thus the pane of frosted glass can be rapidly removed in use of the camera in said slide projection camera combination, means blocking the view-finding system optically from the picture-taking system of the camera, a plate of clear glass permanently disposed on top of the eye opening of the camera, and means on the camera cooperating with means on the frame for rapidly detachably securing the camera to the frame with the eye opening disposed in line with the slide holder and on the side of the same opposite from the side on which light is directed through the slide holder.

5. In a slide projection camera combination comprising a modified focusable twin-lens reflex camera as set forth in claim 3: a projection attachment constituting a base, a frame, a socket on the frame for a projection lamp, a slide holder carried by the frame and disposed above the base, said slide holder having an opening, means carried by the frame directing light from the projection lamp through the slide holder opening downwardly towards the base, and means detachably supporting said camera with the eye opening of the view-finding system in line with the opening in the slide holder and on the side thereof opposite to the light-directing means.

6. An apparatus for slide projection, said apparatus comprising a projection attachment, a slide holder having an opening therein, a modified focusable twin-lens reflex camera, and means rapidly detachably securing said camera to said attachment; said projection attachment including a base, a frame, a socket on said frame for a projection lamp, said slide holder being carried by and disposed above the base, and means carried by the frame directing light from the projection lamp through the slide holder opening downwardly towards the base; said modified focusable twin-lens reflex camera having a picture-taking system and a large aperture, optically unobstructed view-finding system, said view-finding system including an eye opening at the top of the camera and a scene opening at the front of the camera, the eye opening of said system being disposed in line with the opening in the slide holder and constituting, therefore, projection means for light which has passed through said opening in the slide holder, a separate hood for shielding the eye opening, a pane of frosted glass, spring clip means rapidly detachably securing said hood and said pane to said camera over the eye opening against lateral and vertical movement with the pane at the focus of the view-finding system, whereby the hood and the pane of frosted glass can be rapidly removed for use of the camera in the slide projection apparatus, and means blocking the view-finding system optically from the picture-taking system of the camera; and the means rapidly detachably securing the camera to the frame locating said camera with its eye opening disposed in line with the opening in said slide holder and on the side of the same opposite from the side on which light is directed through the slide holder.

References Cited in the file of this patent

UNITED STATES PATENTS

| 465,409 | Knipe | Dec. 15, 1891 |
| 906,222 | Hall | Dec. 8, 1908 |
| 947,058 | Duncan | Jan. 18, 1910 |
| 1,024,200 | Hutchings | Apr. 23, 1912 |
| 1,284,545 | Allan | Nov. 12, 1918 |

(Other references on following page)

UNITED STATES PATENTS

| Number | Name | Date |
|---|---|---|
| 1,292,005 | Minor | Jan. 21, 1919 |
| 1,346,319 | Konieczny | July 13, 1920 |
| 1,572,899 | Mastrukoff | Feb. 16, 1926 |
| 1,591,567 | Shinn | July 6, 1926 |
| 2,133,218 | Verschoor | Oct. 11, 1938 |
| 2,285,915 | Dutton | June 9, 1942 |
| 2,294,445 | Bressler | Sept. 1, 1942 |
| 2,484,510 | Hutchison | Oct. 11, 1949 |

FOREIGN PATENTS

| Number | Country | Date |
|---|---|---|
| 597,375 | Germany | May 24, 1934 |
| 448,017 | Great Britain | 1936 |
| 676,496 | Germany | June 5, 1939 |